United States Patent
Enoksson et al.

(10) Patent No.: US 7,654,159 B2
(45) Date of Patent: Feb. 2, 2010

(54) MEMS NANOINDENTER

(75) Inventors: Peter Enoksson, Mölndal (SE);
Alexandra Nafari, Göteborg (SE);
Håkan Olin, Sundsvall (SE); Fredrik Althoff, Mölnlycke (SE); Andrey Danilov, Göteborg (SE); Jens Dahlström, Mölndal (SE)

(73) Assignee: Nanofactory Instruments AB, Göteborg (SE)

( * ) Notice: Subject to any disclaimer, the term of this patent is extended or adjusted under 35 U.S.C. 154(b) by 191 days.

(21) Appl. No.: 10/586,729

(22) PCT Filed: Jan. 26, 2005

(86) PCT No.: PCT/SE2005/000098

§ 371 (c)(1),
(2), (4) Date: Jul. 21, 2008

(87) PCT Pub. No.: WO2005/069748

PCT Pub. Date: Aug. 4, 2005

(65) Prior Publication Data

US 2008/0276727 A1    Nov. 13, 2008

(30) Foreign Application Priority Data

Jan. 26, 2004    (SE) .................................... 0400177

(51) Int. Cl.
*G01L 1/16* (2006.01)
*G01B 7/16* (2006.01)

(52) U.S. Cl. ..................... 73/862.68; 73/777
(58) Field of Classification Search ........... 73/104–105, 73/862.68, 777
See application file for complete search history.

(56) References Cited

U.S. PATENT DOCUMENTS

| 5,278,408 | A  | * | 1/1994  | Kakibayashi et al. | ....... 250/311 |
| 5,840,597 | A  |   | 11/1998 | Hartauer |  |
| 6,026,677 | A  | * | 2/2000  | Bonin | ......................... 73/105 |
| 6,806,991 | B1 | * | 10/2004 | Sarkar et al. | ................. 359/290 |
| 7,461,543 | B2 | * | 12/2008 | Degertekin | .................. 73/105 |

FOREIGN PATENT DOCUMENTS

| WO | WO 96/12930  | 5/1996 |
| WO | WO 01/63204  | 8/2001 |
| WO | WO 03/043051 | 5/2003 |

OTHER PUBLICATIONS

International Search Report (PCT/ISA/210).

* cited by examiner

*Primary Examiner*—Max Noori
(74) *Attorney, Agent, or Firm*—Harness, Dickey & Pierce, P.L.C.

(57) ABSTRACT

A force sensor (200) and nanoidenation system (300) using such force sensor (200), wherein the force sensor (200) comprise a movable membrane (207) attached to a fixed bulk structure (210) with springs (201, 202, 203, 204) formed between the membrane (207) and bulk structure (210); the springs (201, 202, 203, 204) may be provided two on each side of a rectangular membrane(207) and each in the form of a U-shape with displacing elements (801) formed perpendicular to each open end of each U-shaped spring (800). The force sensor further comprises electrodes (206) for detecting capacitive changes between the movable membrane (207) and the electrodes (206) in order to measure a movement in relation to an applied force. The membrane (207) further comprises a probe holding structure (214) for providing a solution for interchangeable probes (211).

13 Claims, 8 Drawing Sheets

MEMS NANOINDENTER

FIELD OF THE INVENTION

The present invention relates to a nanoindentation device and in particular a micro electro mechanical system (MEMS) device for nanoindentation in situ of a transmission electron microscope (TEM).

BACKGROUND OF THE INVENTION

Tremendous efforts are on going within the nanotechnology field of research in order to both develop new products and understand the behavior of materials at the nano scale. This is a truly cross disciplinary field, involving mechanical, electrical, chemical, and biological areas of interest. One of these fields is the material field studying the behavior of materials at the nano scale, developing new materials, and enhancing material characteristics. In order to be able to work within these new fields new instrumentation is currently being developed.

An interesting and growing research field within the nanotechnology field is mechanical indentation of materials in order to characterize material properties and to understand mechanisms involved in mechanical processes of materials. This is a research field that now is evolving towards the nano area where materials subject to nanoindentation will give answers to many important questions about materials properties at the nano scale. Also today many materials or application of them are only available at the nano scale, such as thin films, nanotubes, fullerenes and so on. Instrumentation are available that enable such experiments where an object of interest is tested on the nano scale; however, the available instrumentation is quite large in volume and can only perform one type of measurement at a time due to this. For instance, the instrument can perform a nanoindentation on the object and then the object need to be transferred to another instrument for analysis of the resulting indentation.

Due to this some instruments have been developed that can view the indentation process with for instance an optical microscope during the indentation process or an atomic force microscope (AFM) after the process.

It is not an easy task with the current state of the art to do nanoindentation measurements on very small structures such as nanotubes. These types of objects can not be localized in a normal microscope instead an electron microscope is one of the best suited tools for observing these structures and objects. However, it is very difficult to do nanoindentation experiments in situ of an electron microscope.

There is a need for a small footprint nanoindentation device that may be used for these types of combined measurements, especially as a combination with a transmission electron microscope (TEM). In this type of combination a powerful tool for the materials researcher is provided, where the instrumentation provide the possibility to indent the object of interest at the nano scale while simultaneously observing the result using the transmission electron microscope. This enables the observation of the dynamic processes involved during the experiment.

MEMS stands for Micro electro mechanical Systems, a manufacturing technology used to produce electromechanical systems using batch fabrication techniques similar to those in IC manufacturing (Integrated Circuits). MEMS integrate mechanical structures, such as sensors and actuators, and electronics on a substrate (e.g. silicon) using micromachining. The idea of using silicon for fabrication of mechanical structures has been around since 1980's due to its outstanding mechanical properties in miniaturized systems. Thanks to the IC industry silicon is produced with very few defects at a low cost. A combination of silicon based microelectronics and micromachining allows the fabrication of devices that can gather and process information all in the same chip. This introduces powerful solutions within for instance automobile production, scientific applications and medical industries.

It is the object of this invention to provide such a nanoindentation device that is small and versatile enough to be Implemented inside a TEM or any other electron microscope device, e.g. scanning electron microscope (SEM).

SUMMARY OF THE INVENTION

The present invention relates to a MEMS (micro electro mechanical system) or NEMS (nano electro mechanical system) sensor structure used as a force sensing device in a nanoindenter or in an atomic force microscope. The sensor use a capacitive sensing technique with one or several sensing elements detecting the deflection of a membrane with a tip attached to it. In a nanoindentation application the tip is preferable a diamond tip or of some other mechanically hard material, such as tungsten (W). The membrane is attached to a fixed rigid structure via a plurality of springs enabling a movement of the membrane i relation to the fixed rigid structure. A capacitive change is measured between the membrane and electrodes formed beneath the membrane. On top of the membrane a tip fastening unit is formed enabling fastening of any suitable tip according to application.

The capacitance changes are sensed in relayed to connectors for further connection to pre-amplification and/or analysis electronics. Using several sensing electrodes enables a measurement of lateral forces as well as horizontal forces.

The sensor structure is produced in a MEMS production process in a silicon wafer later combined with a deposited aluminum layer on a glass substrate.

A complete nanoindentation or AFM systems according to the present invention comprise sensing element, processing electronics, computational unit for display and analysis of provided measurement data, and mechanical setup for sensor and sample with respect to each other.

In a first aspect of the present invention, a force sensor fabricated in a micro machined process is provided, for use in for instance a nanoindentation setup, wherein the force sensor comprises:
  a membrane movable in relation to a bulk structure;
  at least one detection element in a detection structure in connection with a bulk structure;
  connectors for connecting the force sensor to electronics;

characterized in that the membrane is attached to the bulk structure through at least one spring and that the membrane include a probe holding structure, the at least one spring provide the membrane with movement capabilities for the membrane in at least one direction with respect to the bulk structure; the movement is measured using the at least one detection element.

In the force sensor the detection structure may comprise at least three detection elements, providing both lateral and horizontal sensitivity.

A force acting on a probe attached to the probe holding structure may be measured by detecting capacitive changes between the membrane and the detection element or a force acting on a probe attached to the probe holding structure may be measured by detecting a piezoelectric effect in a detection element.

In the force sensor the membrane may have a rectangular shape as seen from a view perpendicular to a plane parallel to the detection element.

The membrane may be attached to the bulk structure with 8 springs, and the springs may be located two on each side of the membrane as seen from a view perpendicular to a plane parallel to the detection element; the two springs are located in a mirror like formation providing symmetric movement.

It the force sensor the at least one spring may comprise a U-shaped form with heels protruding at two respective open ends in order to space the U-shaped form away from the membrane and the bulk structure.

The force sensor may further be arranged so that the probe holding structure is recessed relative the bulk structure.

Another aspect of the present invention, a nanoindentation device for use in a transmission electron microscope is provided, comprising
a force sensor as described above;
a nanoindentation probe mounted on the force sensor;
a displacement device with nano positioning resolution; and
a sample holding structure;
wherein the force sensor, nanoindentation probe, displacement device, and sample holding structure are mounted on a transmission electron microscopy (TEM) sample holder, the sample holding structure and nanoindentation probe is movable in relation to each other.

The displacement device may be an inertial motor;

Still another aspect of the present invention, a method for producing a force sensor is provided, using a substrate with a buried oxide layer, comprising the basic steps of:
etching a cavity on a first side of said substrate;
providing on said first side of said substrate with an oxide mask;
p++ doping on a second side of said substrate;
patterning said second side of said substrate using double-sided lithography and etching down said second side of said substrate to said buried oxide layer;
providing an enhanced oxide mask on said first said of said substrate and etching springs;
deep dry etching of said first side of said substrate to obtain a probe holding structure; and
bonding said sensor chip anodically with a glass substrate comprising connectors.

A plurality of the sensor chips is produced on wafer.

These and other aspects of the invention will be apparent from and elucidated with reference to the embodiments described hereinafter.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF THE INVENTION

Figure 1:
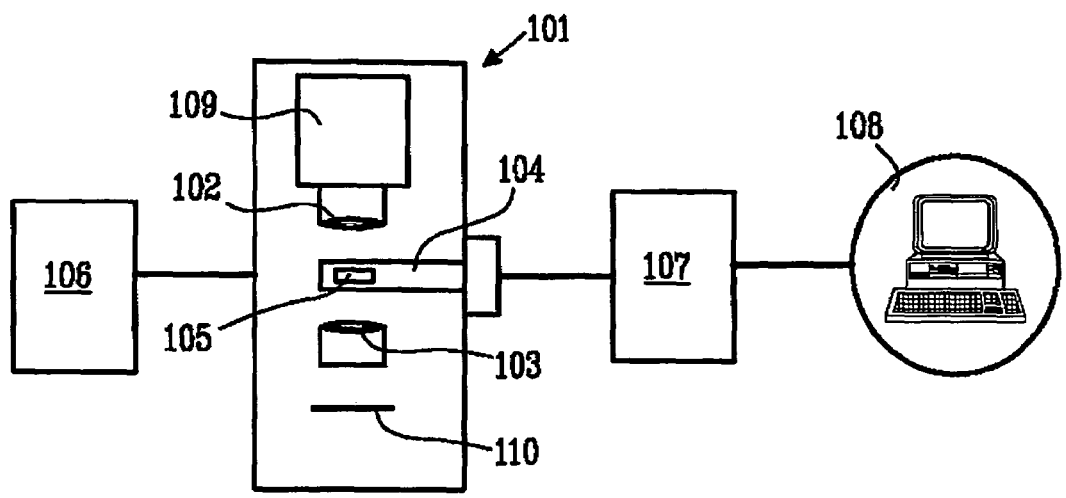
FIG. 1 illustrates an experimental setup according to the present invention.

FIG. 1 illustrates a schematic of an experimental setup system according to the present invention. In a preferred embodiment of the present invention a nanoindenter 105 is provided for a transmission electron microscope (TEM) 101. The nanoindenter is mounted on a TEM sample holder 104 and movement and measurement data is acquired using a measurement system comprising control electronics 107 and a computational system 108 comprising e.g. a personal computer, display unit and interface peripherals (such as a keyboard and mouse).

The TEM 101 operates by forming a beam of electrons directed towards a sample and after interaction with the sample, the electron beam is directed towards an image viewing or collecting device 110, respectively using magnetic lenses 102 and 103. The electron beam is produced using an electron emitting device 109. The TEM 101 is controlled by a TEM control system 106 as understood by the person skilled in the art. However, it is possible to combine the nanoindentation control system 108 with the TEM control system 106. The present invention may be used in any type of standard or non standard TEM solution, e.g. standard TEM's such as TEM instruments from the FEI Tecnai series or JEOL JEM 2010 series. FEI and JEOL are two of the largest TEM manufacturers in the world.

Figure 2A:
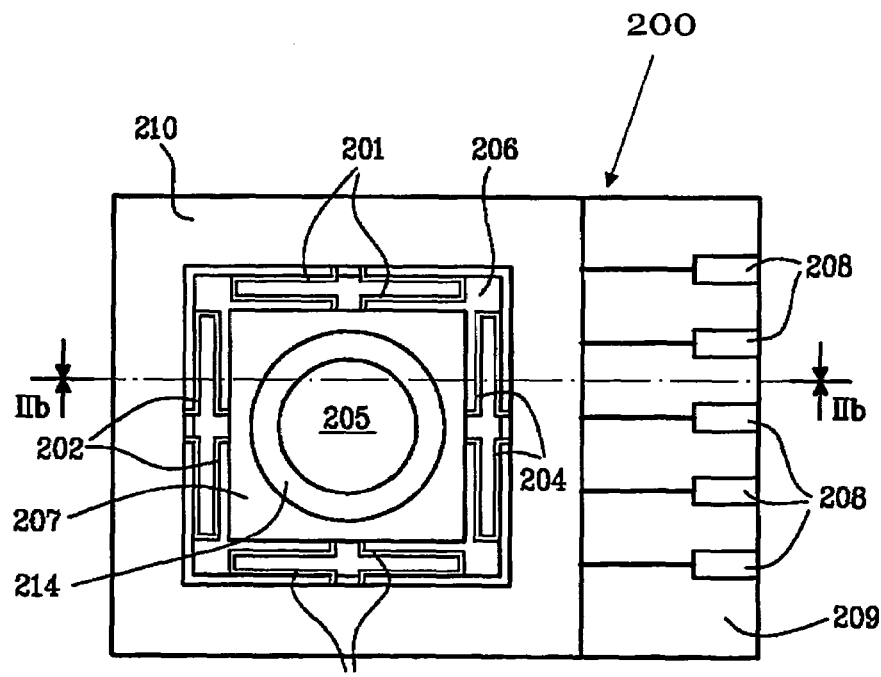
FIG. 2a illustrates a schematic top view of nanoindenation sensor according to the present invention.
Figure 2B:
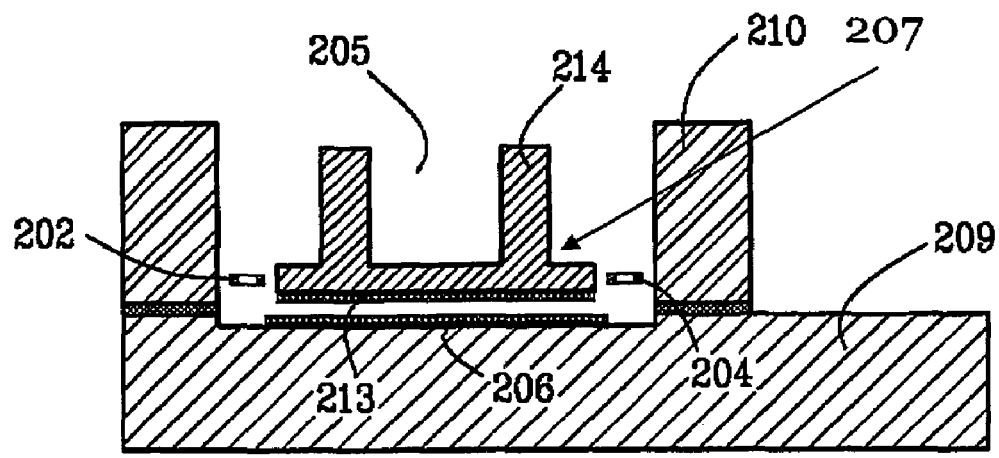
FIG. 2b illustrates a-schematic-side view of nanoindenation sensor according to the present invention.
Figure 2C:
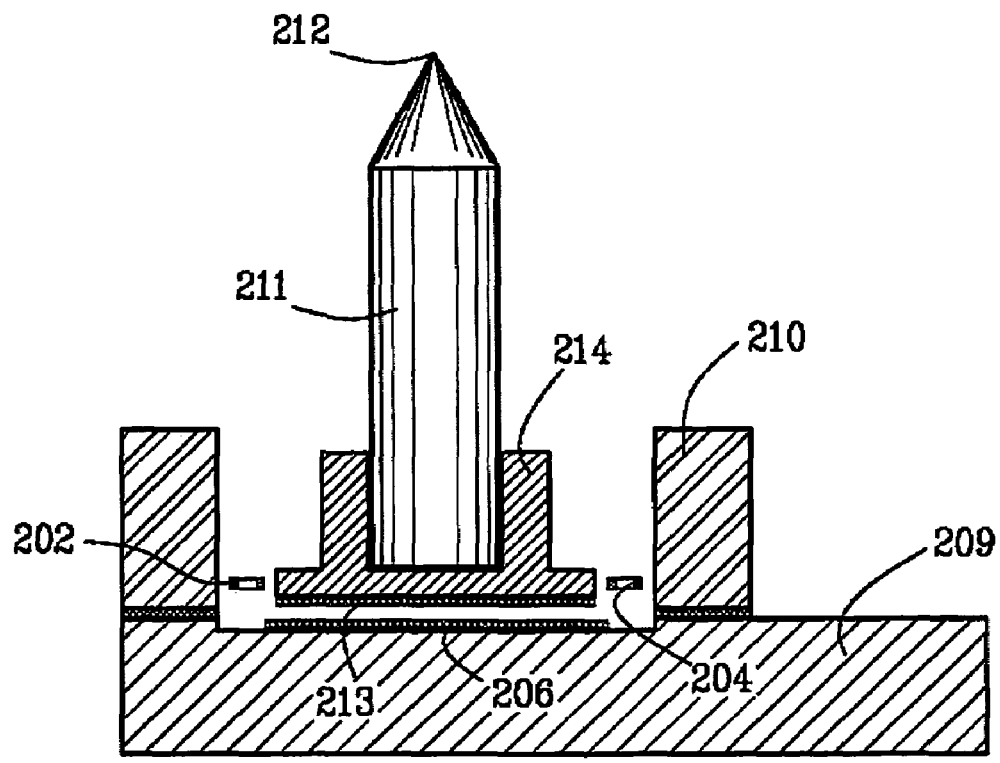
FIG. 2c illustrates a schematic cross section through line IIb-IIb in FIG. 1a of nanoindenation sensor according to the present invention.

FIGS. 2a, 2b, and 2c shows the force sensor in detail in three different views, wherein FIG. 2a shows an upper view of the force sensor, 2b a side view in cross section of the line IIb-IIb of FIGS. 2a, and 2c shows a schematical side view of the force sensor with a tip mounted on the sensor. The sensor chip 200 comprise a plurality of springs 201, 202, 203, and 204 connecting a silicon base structure 210 and a membrane 207 and allowing the membrane 207 to move with respect to the fixed silicon base structure 210. The membrane 207 has probe holding structure 214 for fastening a tip 211 or similar probe on top of the sensor 200. This arrangement provides the possibility to have interchangeable tips 211 increasing the flexibility of the sensor 200 and increasing the possibilities for the users of the sensor 200. The probe holding structure 214 is slightly recessed relative the surrounding bulk structure 210 in order to protect it from damage during handling or if it is exposed to potentially damaging mechanical forces, e.g. if dropped during handling.

The silicon base structure 210 with the membrane 207 and interconnecting springs 201, 202, 203, and 204 is mounted on a glass substrate 209 via anodic bonding. When a force is applied to the tip 211, the membrane 207 will move accordingly proportional to the applied force. The capacitance is measured between a p++ doped lower part 213 of the membrane 207 and a detection structure 206 comprising one or several detection elements such as electrodes 206 on the glass substrate 209 beneath the membrane 207. Connectors 208 are connected to the electrode or electrodes 206 on the glass substrate 209 and it is possible to connect to these connectors externally with for instance wiring and thus it is possible to measure the capacitance between the electrode(s) 206 and the membrane 207. This capacitance will be proportional to the displacement of the membrane 207 with respect to the electrode(s) 206, which in turn will be proportional to the applied force to the tip 211 since the tip 211 is rigidly mounted in the tip fastening structure 214 which has a opening 205 for the tip to be mounted in. The tip 211 may be fastened by extrusion of the tip 211 between the walls 214 of the tip fastening structure or it may be glued or fastened by any other suitable process as appreciated by the person skilled in the art. The top end 212 of the nanoindentation tip 211 may be formed according to any suitable geometrical structure for indentation purposes. The top end may, for instance, be formed in a pyramidical, spherical, or conical structure. The top end 212 may be of any standard shape as used within the indentation field, such as but not limited to, Vickers, Berkovich, conical, Rockwell, and Knoop. It is also possible to have the tip 211 in one material and the top end 212 in another material In order to reduce cost of production of the tip 211.

The probe holding structure 205 may be provided with a Chrome layer (or similar material as appreciated by the person skilled in the art) on the Inside walls in order to provide a better electrical contact when the tip is mounted and fastened. The tip may be fastened using for instance electrically conducting glue, such as silver epoxy. The Chrome layer may be applied to the side walls and/or the bottom of the tip holding structure 205. The open end of the probe holding structure 214 may be recessed as compared to the bulk structure 210 in order to protect it from damage.

Instead of measuring the capacitance between the electrode 206 and the membrane 207, other measurement principles may be utilized, such as one or several piezoresistive springs 201, 202, 203, 204 or magnetoelastic springs 201, 202, 203, 204.

Figure 8:
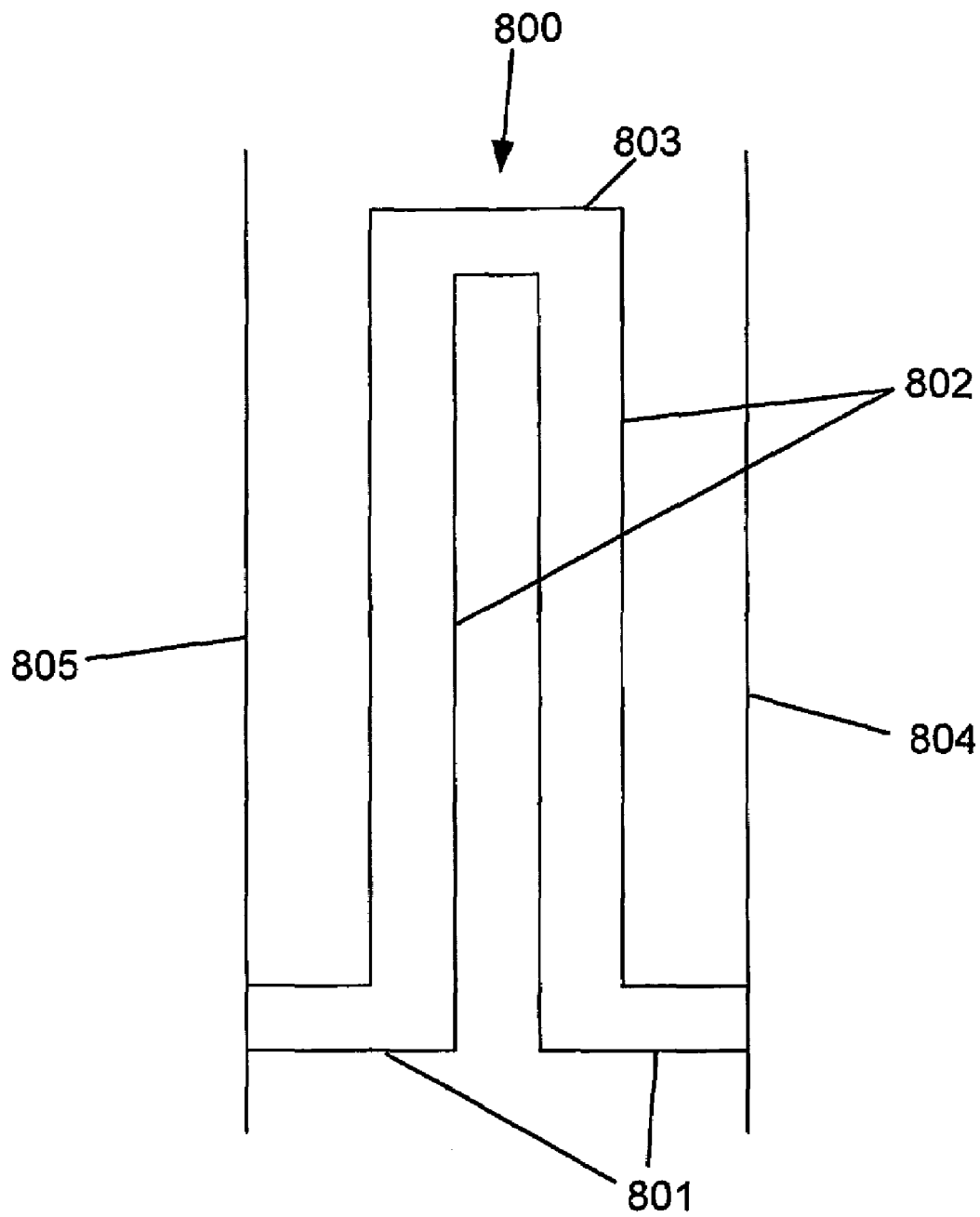
FIG. 8 illustrates a top view of a spring.

In FIG. 8 a top view of a spring 800 is schematically depicted. The spring 800 in the form a U shape is built up through two legs 802 interconnected with a spacer 803. At the open end of the U shaped form heels 801 protrudes away from the U shaped form in order to provide spacers towards the membrane side 805 and the bulk structure 804.

The force sensor may be used within other application areas apart from in situ of a TEM, for instance in a standard indentation measurement setup in a so called bench top setup. The present invention may find application in both a standalone nanoindentation measurement device or in a combined nanoindentation device and image obtaining device (e.g. an optical microscope or an AFM).

Figure 3A:
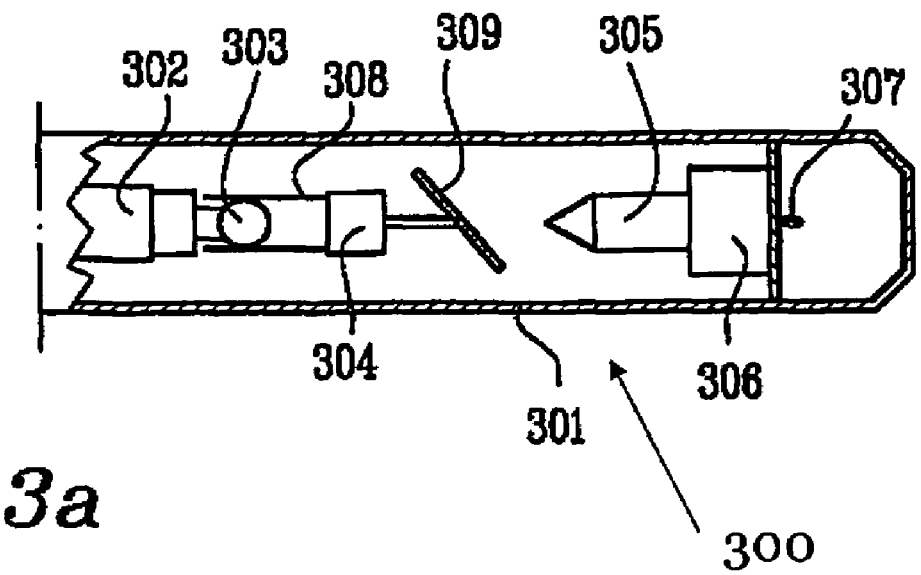
FIG. 3 illustrates a schematic block diagram of a close up a sample region in a TEM with a sensor according to the present invention.
Figure 3B:
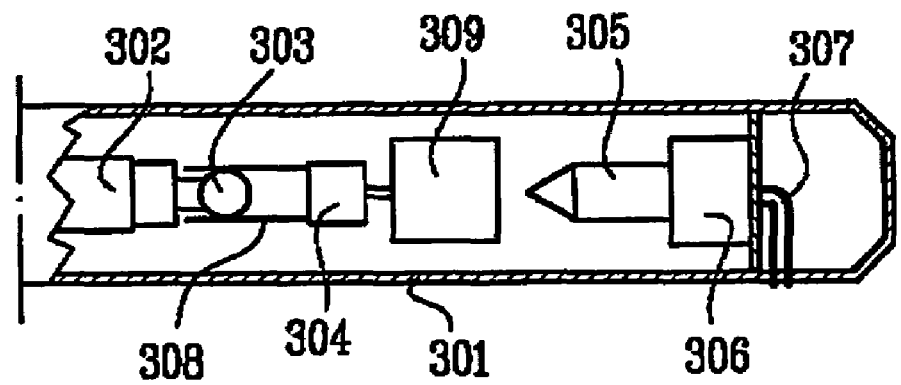

FIGS. 3a and 3b shows an enlarged view of a TEM sample holder with a nanoindentation sensor 306 and sample holder 304. In these figures the force sensing device is mounted on the TEM sample holder and the support structure 209 of the sensor is fixed with respect to the frame 301 of the TEM sample holder 300 and the sample holder 304 is mounted on a piezo 302 driven motor mechanism. The piezo driven mechanism operates with an inertial slider principle, wherein an object 304 is mounted on a ball 303 with a plurality of spring legs 308. The ball 303 is rigidly mounted on a piezoelectric device 302 with one or several possible directions of movement depending on electrodes present on the piezoelectric device 302. When a voltage is applied to an electrode on the piezoelectric device 302 it Is made to deflect in a certain direction. The ball 303 may thus be made to extend forward and then quickly made to be retracted by rapidly changing the voltage applied to the electrode on the piezoelectric device 302, by inertial forces the sample holder 304 may thus be made to move relative the ball 303. By repeating this movement it is possible to move the sample holder 304 forward, backwards, or to different directions depending on the applied voltage to the piezoelectric device 302, this inertial slider movement principle induces "large" translations up to several micrometers in range. Smaller movements may be produced only by applying voltages to one or several electrodes on the piezoelectric device 302; this may give movements with an accuracy of the order sub Angstrom. In the case of the present invention the sample under observation is mounted on the piezo driven motor mechanism and the force sensor support structure 209 is fixated rigidly on the frame 301 of the TEM sample holder 300. The force sensor support structure 209 may be mounted on the TEM sample holder in many suitable ways, for instance glued, mounted on a pin, screwed, or mounted in a clamping mechanism for rapid change of force sensor. The invention is not limited to the above described design, it is also possible switch place between the sample and the force sensor, i.e. to mount the force sensor on the piezo 302 driven motor mechanism and the sample on the frame 301 of the TEM sample holder 300. It should also be understood by the person skilled in the art that other solutions are possible regarding the ball 303 wherein other geometrical structures may be utilized, for instance if only movement in two directions are needed, a cylinder shaped form may be used.

The end part of the TEM sample holder wherein, as exemplified in FIG. 3, the force sensor 306 and probe 305 resides may be electrically shielded using a Faradays cache in order to reduce unwanted electrostatic build up due to the electron beam. Such a shield has a opening through which the probe 305 protrudes.

Figure 4:
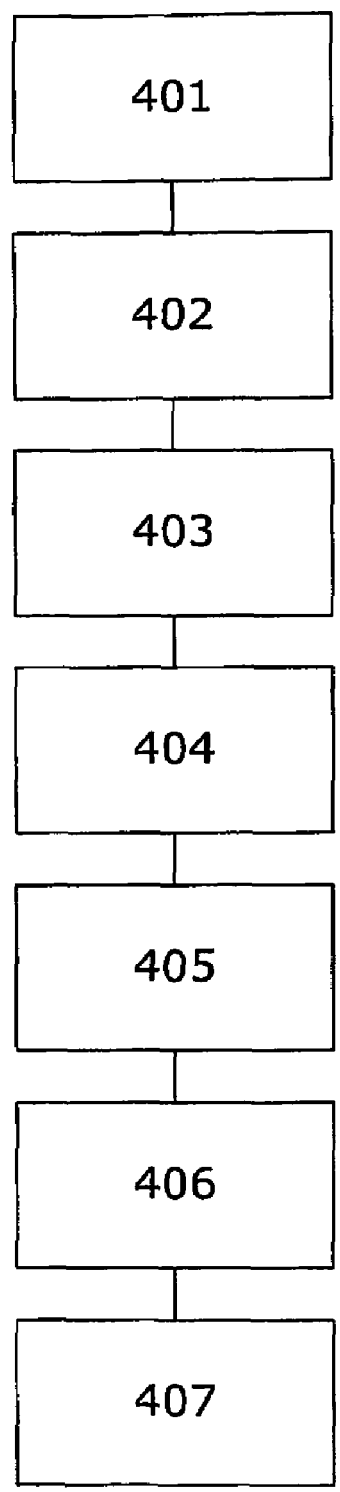
FIG. 4 illustrates a schematic block diagram of a method according to the present invention.

FIG. 4 illustrates steps of a method of producing a force sensor according to the present invention. The sensor chip is manufactured through a clean room process comprising the basic steps of:
1. Front side lithography of a silicon (Si) wafer and etch shallow.
2. Grow oxide layer on Si-wafer.
3. Etch back side.
4. Make P type doping.
5. Back side lithography of the Si-wafer and etch shallow.
6. Front side lithography in order to enhance the oxide pattern.
7. Etch oxide pattern.
8. Deep reactive ion etching (DRIE) of a silicon wafer on front side forming a fixture and release the springs.
9. Etch the remaining oxide mask A second process is used for fabricating a substrate and connection layer:
1. Lithography on front side of a glass substrate wafer.
2. Etch glass.
3. Evaporate aluminum layer on the glass wafer.
4. Lithography of the glass wafer.
5. Etch aluminum for electrode or electrodes.

The deep dry etch that forms the fixture and releases the springs is a critical step, where the wafer Is etched about 500 µm, with a ratio of 1:5. Oxide may be grown and masked to later be combined with resist and used as mask during the deep etch. The lower part of the silicon is p++ doped to form an ohmical contact between the aluminum contact deposited on the glass and the silicon. The spring structure may be etched In the lower part with resist as mask. Cavities may be etched in the glass and aluminum electrodes deposited. When the glass wafer and the silicon wafer are processed they may be anodically bonded together. The anodic bonding may be performed with ±500-700V and 400° C. The aluminum may be thinned to 0.45 µm in order to increase the bonding efficiency. The electrodes may be interconnected to be at the same electrical potential during the anodic bonding to decrease the risk of unwanted bonding. The glass substrate part with the aluminum electrodes provides the electrical interconnections in order to connect the sensor 200 to an external measurement system.

The two components are aligned using marks fabricated in the fabrication process and then bonded to each other using an anodic bonding process or any other suitable bonding process as understood by the person skilled in the art. The wafer is now ready and individual sensors may be removed from the wafer containing a plurality of sensors. The complete process is not described above; only the most important steps are discussed. Intermediate steps comprising cleaning and protection steps are not described since the may be understood and appreciated by the person skilled in the art.

In a preferred embodiment of the process a starting material is a SOI wafer, 400 μm thick, with a device layer of 13 μm. A buried oxide layer is provided of 0.6 μm thickness. A recess of 20 μm is etched to lower part of the substrate on a front side (first side). Oxide is grown on the first side of the wafer, to prepare for the DRIE-etch and the wafer is p++ doped on a backside (second side). Using double-sided lithography the backside is patterned and etched down to the buried oxide layer. The grown oxide on the front side is then patterned and the structured is etched to form the probe holding structure (fixture) and release the springs. After the buried oxide is removed, the silicon structure is anodically bonded to a glass substrate process as earlier described. Here anodic bonding may be performed using a current limitation of 1 mA.

This method may be summarized in the following steps with reference to FIG. 4:

etching a cavity on a first side of a substrate with a buried oxide layer (step 401);

providing on said first side of said substrate with an oxide mask (step 402);

p++ doping on a second side of said substrate (step 403);

patterning said second side of said substrate using double-sided lithography and etching down said second side of said substrate to said buried oxide layer (step 404);

providing an enhanced oxide mask on said first said of said substrate and etching springs (step 405);

deep dry etching of said first side of said substrate to obtain a probe holding structure 214 (step 406); and bonding said sensor chip anodically with a glass substrate comprising connectors 208 (step 407).

Figure 5:
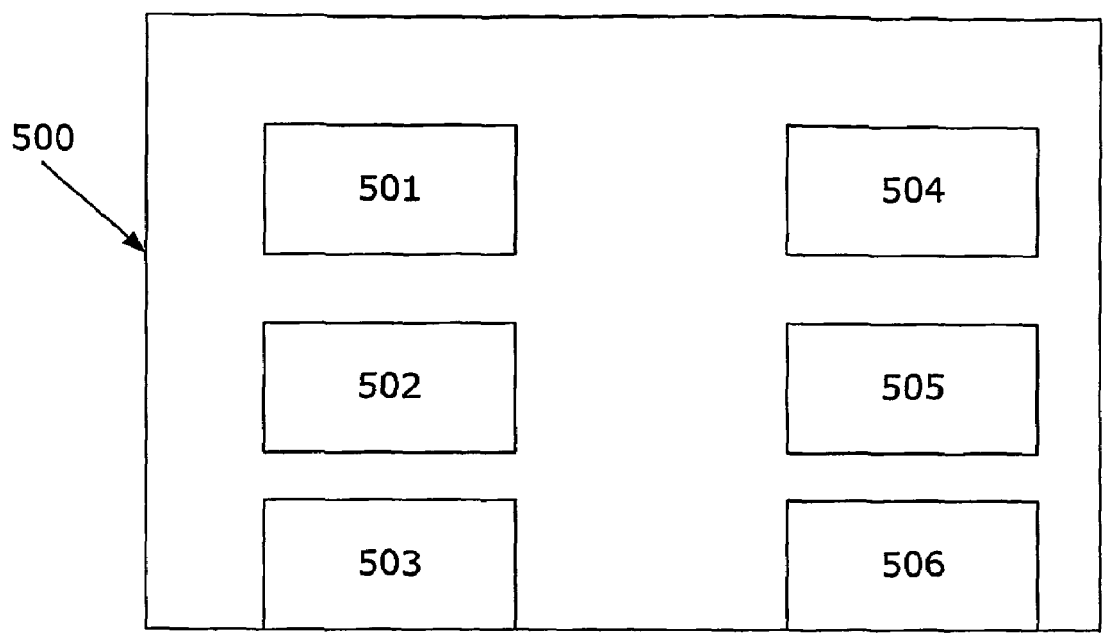
FIG. 5 illustrates a schematic block diagram of a processing device according to the present invention.

FIG. 5 illustrates a measurement device 500 for use in a measurement setup according to the present invention. The measurement device 500 may comprise a processing unit 501, such as a microprocessor, FPGA (Field Programmable Gate Array), ASIC (Application Specific Integrated Circuit), or DSP (Digital Signal Processor), one or several memory units 502 (volatile (e.g. RAM) or non-volatile (e.g. hard drive)), and a data sampling unit 503 obtaining data either directly or indirectly from the experimental setup. Data may be obtained through direct sampling with an A/D converter (analog to digital) or collected from another pre-processing device (not shown) and obtained through a communication link (not shown) such as Ethernet or a serial link. The measurement device 500 may further optionally comprise a communication unit 506 for communicating measurement data sampled, analyzed, and/or processed to another device for display or storage purposes for instance. Also the measurement device 500 may further comprise a pre-processing unit 504 and a measurement control unit 505.

Figure 6:
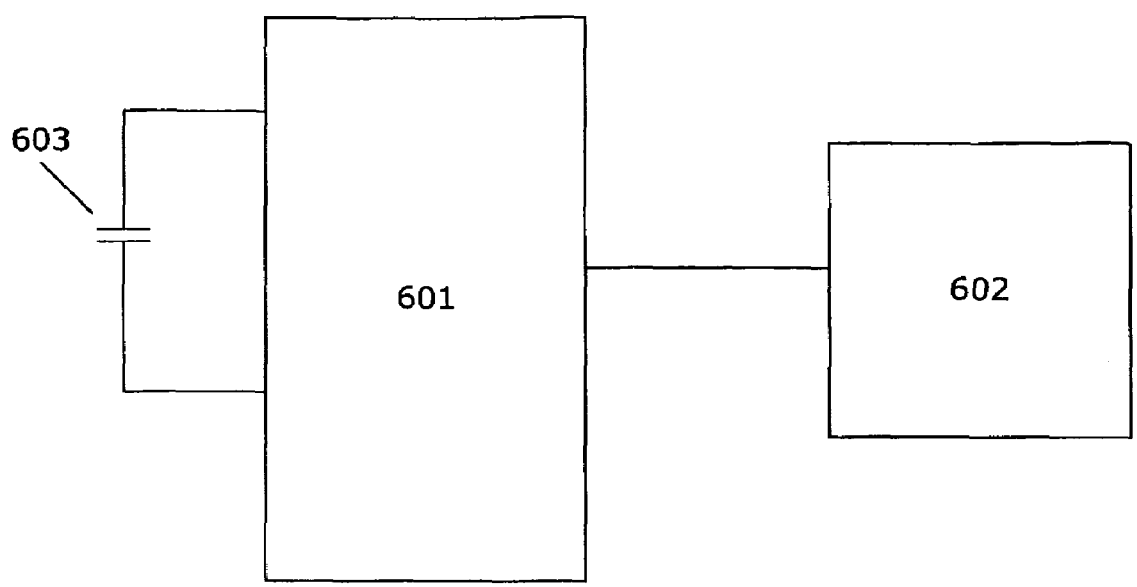
FIG. 6 illustrates a schematic block diagram of an electrical circuit for measuring from the nanoindenter sensor according to the present invention.

FIG. 6 is a schematic block diagram of a pre-amplification and/or processing device according to the present invention. However it should be appreciated by the person skilled in the art that the pre-amplification and/or processing device may be provided in the sensing MEMS or NEMS element and produced during the production of the sensing element as part of the production process and incorporated on this element.

The electronics setup may comprise a pre-amplifier 601 for enhancing the signal and increasing the stability of the signal, for instance if a capacitive solution is used as is illustrated in FIG. 6, the signal may be converted to a voltage signal and amplified to a suitable level in the pre-amplifier 601 in order to reduce problems with stray capacitive effects often present when using long electrical wiring. In a preferred embodiment of the present invention very small capacitive signals are measured and stray capacitive effects will play a substantial role in the signal to noise ratio and care must be taken to reduce these effects when designing the mechanical and electrical experimental setup. Amplification may for instance be provided close to the sensor or even on the sensor chip itself in order to reduce noise problems. The signal may then further be connected to a complete control and sampling electronics setup 602 or may be connected independently to a measurement system or a sampling circuitry depending on the experimental setup.

The control and sampling electronics setup may comprise control electronics for controlling the piezo driven motor and applying feedback for different applications. In order to retain a certain force on a sample a feedback system is convenient to use. This is especially important in a system where small distances or forces are in action. For a nanoindentation system already minute vibrations and/or temperature differences may cause the system to change any parameters under control relatively large. This may be counteracted by a feedback system measuring a desired feedback parameter and trying to keep this parameter constant.

A nanoindenter system may comprise different measurement setup and experimental setup functions controllable from a control system in software or in hardware. These types of functions may include, but is not limited to, different ways of applying force and making indentations on a sample, ramping of force curves, time limited indentations, repeated indentations, and depth limited indentations.

Due to the geometrical configuration of the TEM and nanoindenter special requirements are set on a sample. Since it should be able to indent on the sample while at the same time acquire Images with the TEM the geometrical considerations of the sample limit the type of samples to be applied. Normal TEM samples, e.g. thin samples, may be used since they are thin enough for the electron beam to pass through. However, in some applications the sample is actually too thin and will bend or buckle under the nanoindenter tip pressing on the surface. This will not give an accurate nanoindentation measurement. Instead a special kind of sample may be used wherein a wedge type ridge is produced In silicon or similar material according to MEMS technology.

Figure 7A:
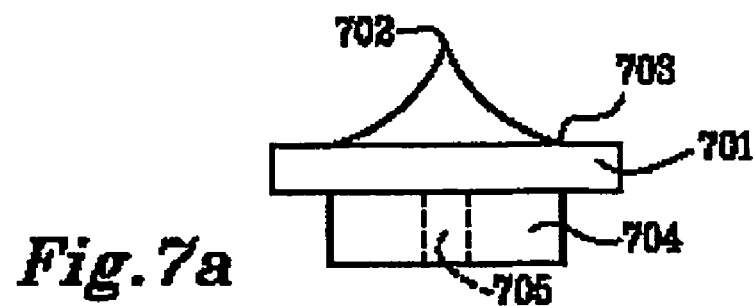
FIG. 7a shows a side view from a short end of the sample, 7b is a top view, and 7c is a perspective view.
Figure 7B:
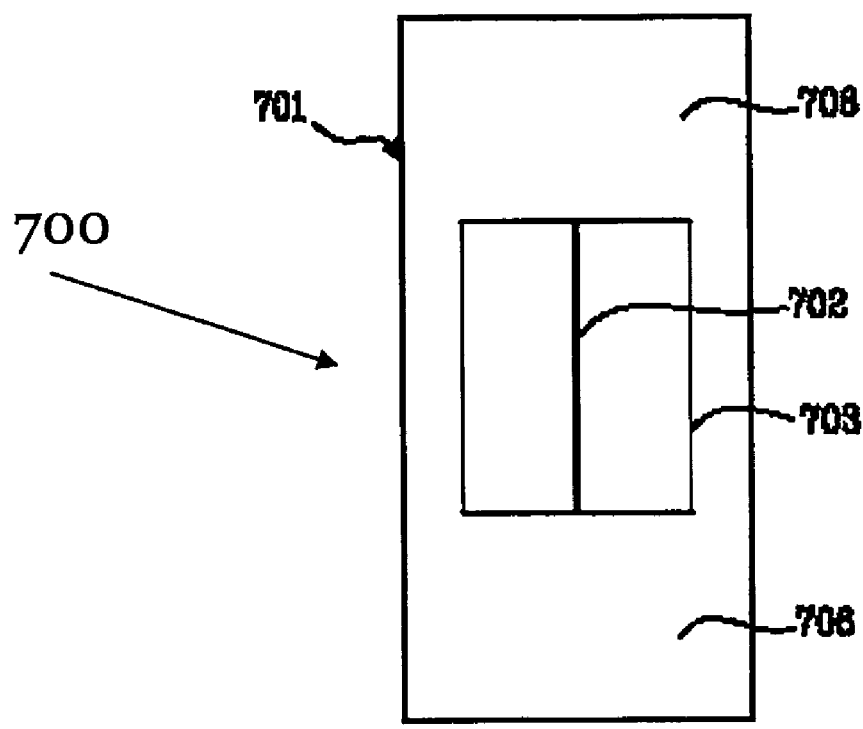
FIG. 7 illustrates a sample for use in a nanoindentation measurement according to the present invention.
Figure 7C:
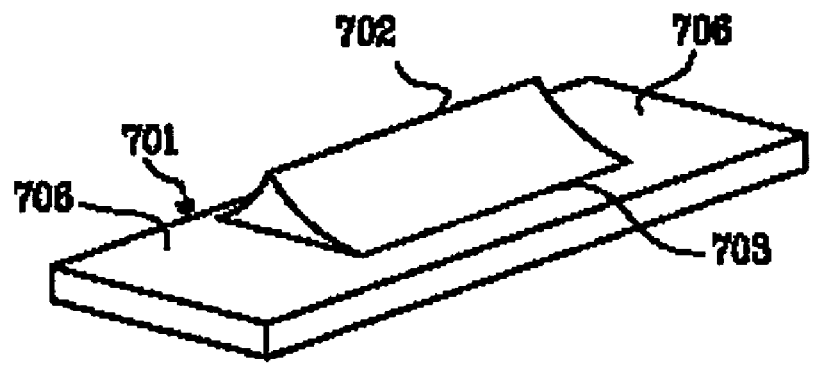

As may be seen in FIG. 7 the sample comprises a ridge 703 with a geometrical cross section thinning more rapidly than linearly towards an end part 702 upon where a nanoindenter tip will press, the ridge is located on a platform 701. Since the thinning towards the end part 702 is not linear there will be a longer range of transmissive area of the sample which may be used in experiments as compared if the curve form would have been linear. Different materials of interest may be deposited onto the ridge for later viewing in the TEM while simultaneously doing nanoindentation on it. The cross section of the sample may be following a curve form similar to an exponential curve form as may be seen in FIG. 7a. A back side element 704 may provide support and allow for mounting elements such as a hole 705, threaded or not threaded. Such a hole or intrusion may also be provided in order to facilitate mounting of the sample on a sample holder, for instance in order to facilitate a centering of the sample on the sample holder.

FIG. 7a shows a schematic side view, also representing a cross section illustrating the curve form of the thinning, of the sample according to the present invention.

The sample further comprises one or several areas 706 adapted to receive fastening means, such as one or several clamping units, for fastening the sample to the sample holder. Other ways of fastening the sample to the sample holder exists, such as gluing or mounting a pin in the hole 705, wherein the pin may be similarly fastened on the sample holder 304.

The sample is produced in an etch process from a silicon wafer or similar material, as appreciated by the person skilled in the art. A silicon wafer is prepared and cleaned and an oxide mask is grown on both sides. A backside of the wafer is applied to a lithographic process producing a resist pattern. A protection foil is glued to the backside. The oxide mask is etched. Resist is removed. Wafer is etched again and front side is applied to a lithographic process forming a resist pattern. Oxide mask is etched. Resist pattern is removed. Wafer is etched yet another time. An oxide is grown in order to sharpen the edge of the ridge and the oxide mask is etched finally producing the ready sample. Several samples are produced on the same wafer and may be individually removed from the wafer.

In another embodiment of the present invention, an AFM (Atomic Force Microscope) application will be described below. The AFM behaves in much the same way as the nanoindenter where a force sensor is used for measuring forces between the tip and the surface of interest. However, in the indenter case a force is applied, whereas in an AFM case a force is measured for a certain distance between the probe and the surface. For an AFM in so called contact mode, the AFM is not made to press into the object but rather only scan the surface of the object much as a vinyl record player scans a record and measures the topographic profile on the surface. An AFM may be operated in several different modes:

1. Contact mode, wherein the tip has direct physical contact with the surface;
2. Non-contact mode, wherein the tip is vibrated above the surface and changes in the vibration amplitude and/or vibration frequency is measured and these parameters are dependant on the force between the tip and the surface; and
3. Intermittent mode, wherein the tip is vibrating above the surface and just barely touches the surface (this is sometimes called tapping mode) and changes in the amplitude, frequency, and/or phase is measured.

It is possible with careful design of the force sensor according to the present invention to achieve suitable range of force sensitivity for it to operate in an AFM application. By letting the piezo 302 vibrate with suitable frequency depending on the application it may be used in both non-contact mode and intermittent mode. It is also possible to use in normal contact mode. The piezo motor may provide scanning control of the tip. However, in order to keep a correct distance to the surface or maintaining a certain force setting, a feedback system for controlling the tip location may be provided.

A system for doing nanoindentation and/or AFM measurements may comprise not only a force sensor, but also control electronics and analysis hardware and software. The control electronics is used for controlling the movement of the sample or sensor and the movement may be performed by a piezo driven motor such as an inertial slider solution.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented by means of both hardware and software, and that several "means" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A force sensor fabricated in a micro machined process so as to have dimensions compatible with a nanoindentation setup, said force sensor comprising:
   a membrane movable in relation to a bulk structure;
   at least one detection element in a detection structure in connection with said bulk structure; and
   connectors for connecting said force sensor to electronics;
   wherein said membrane is attached to said bulk structure through at least one spring, said membrane includes a probe holding structure, said at least one spring provides said membrane with movement capabilities for said membrane in at least one direction with respect to said bulk structure; and said movement is measured using said at least one detection element.

2. The force sensor according to claim 1, wherein said detection structure includes at least three detection elements so as to provide both lateral and horizontal sensitivity.

3. The force sensor according to claim 1, wherein a force acting on a probe attached to said probe holding structure is measured by detecting capacitive changes between said membrane and said detection element.

4. The force sensor according to claim 1, wherein a force acting on a probe attached to said probe holding structure is measured by detecting a piezoelectric effect in a detection element.

5. The force sensor according to claim 1, wherein said membrane has a rectangular shape as seen from a view perpendicular to a plane parallel to said detection element.

6. The force sensor according to claim 1, wherein said membrane is attached to said bulk structure with eight springs.

7. The force sensor according to claim 6, wherein said springs are located two on each side of said membrane as seen from a view perpendicular to a plane parallel to said detection element; said two springs on each side located in a mirror like formation so as to provide symmetric movement.

8. The force sensor according to claim 1, wherein said at least one spring includes a U-shaped form with heels protruding at two respective open ends so as to space said U-shaped form away from said membrane and said bulk structure.

9. The force sensor according to claim 1, wherein said probe holding structure is formed with a recessed open end relative to said bulk structure.

10. A nanoindentation system for use in a transmission electron microscope, said nanoindentation system comprising:
   a force sensor fabricated in a micro machined process, said force sensor including:
   a. a membrane movable in relation to a bulk structure;
   b. at least one detection element in a detection structure in connection with said bulk structure; and c. connectors for connecting said force sensor to electronics;

wherein said membrane is attached to said bulk structure through at least one spring, said membrane includes a probe holding structure, said at least one spring provides said membrane with movement capabilities in at least one direction with respect to said bulk structure; and said movement is measured using said at least one detection element;

a nanoindentation probe mounted on said force sensor;

a displacement device; and a sample holding structure;

wherein said force sensor, nanoindentation probe, displacement device, and sample holding structure are mounted on a transmission electron microscopy (TEM) sample holder, and said sample holding structure and nanoindentation probe are movable in relation to each other.

11. The nanoindentation system according to claim 10, wherein said displacement device is an inertial motor.

12. The force sensor according to claim 1, wherein said probe holding structure is integrally formed with said membrane so as to constitute a single structure.

13. The nanoindentation system according to claim 10, wherein said probe holding structure is integrally formed with said membrane so as to constitute a single structure.

* * * * *